United States Patent [19]
Takeda et al.

[11] Patent Number: 5,406,631
[45] Date of Patent: Apr. 11, 1995

[54] STEREO SIGNAL DEMODULATOR CIRCUIT AND STEREO SIGNAL DEMODULATOR USING THE SAME

[75] Inventors: Isoshi Takeda; Shigeyoshi Hayashi, both of Ukyo, Japan

[73] Assignee: Rohm Co., Ltd., Kyoto, Japan

[21] Appl. No.: 101,699

[22] Filed: Aug. 4, 1993

[30] Foreign Application Priority Data

Aug. 5, 1992 [JP] Japan .................... 4-229167

[51] Int. Cl.$^6$ ............................................. H04H 5/00
[52] U.S. Cl. ............................................ 381/4; 331/34
[58] Field of Search .......................... 381/4, 3; 331/34

[56] References Cited

U.S. PATENT DOCUMENTS

| | | | |
|---|---|---|---|
| 3,950,620 | 4/1976 | Numata | 381/4 |
| 4,091,335 | 5/1978 | Gidma et al. | 331/34 |
| 4,506,376 | 3/1985 | Noguchi | 381/4 |
| 4,595,887 | 6/1986 | Miura | 331/34 |
| 4,933,972 | 6/1990 | Okanobu | 381/4 |
| 4,944,010 | 7/1990 | Ishiguro et al. | 381/4 |
| 5,302,919 | 4/1994 | Abe | 331/34 |

FOREIGN PATENT DOCUMENTS

| | | | |
|---|---|---|---|
| 0055301 | 5/1977 | Japan | 381/4 |
| 0136053 | 10/1981 | Japan | 381/4 |
| 0164633 | 10/1982 | Japan | 381/4 |

Primary Examiner—Curtis Kuntz
Assistant Examiner—Ping W. Lee
Attorney, Agent, or Firm—Fay, Sharpe, Beall, Fagan, Minnich & McKee

[57] ABSTRACT

A stereo signal demodulator circuit demodulates a stereo signal by using a PLL circuit including a voltage-controlled oscillator (VCO) for generating a first oscillation signal and a second oscillation signal having a phase different from that of the first oscillation signal by 90°. The voltage-controlled oscillator circuit includes a first amplifier for outputting a signal whose phase is different from that of an input signal by 90°, a second amplifier for outputting a signal whose phase is different from that of an input signal by 90°, and a third amplifier for outputting a signal whose phase is different from that of an input signal by 180°. The first, second and third amplifiers are connected in series so that an output signal of the third amplifier is different, in phase, from the input signal of the first amplifier by 360°, and a positive feedback loop for feeding back the output signal of the third amplifier to the input of the first amplifier and operating currents of the first and second amplifiers are controlled by the control voltage such that the first oscillation signal is derived from the output of one of the first amplifier and second amplifiers, and the second oscillation signal is derived from one of the input and output of one of the first and second amplifiers.

11 Claims, 5 Drawing Sheets

STEREO SIGNAL DEMODULATOR CIRCUIT AND STEREO SIGNAL DEMODULATOR USING THE SAME

DESCRIPTION

1. Technical Field

The present invention relates to a stereo signal demodulator circuit and a stereo signal demodulator using the same and, particularly, to a stereo signal demodulator circuit which is suitable to be formed as an IC without elements to be mounted externally, and a stereo signal demodulator which uses the stereo signal demodulator circuit and is suitable to be used in an FM and/or AM tuner of an audio and/or video equipment.

2. Background Art

A stereo signal demodulator circuit in the form of an IC has been associated with an oscillator circuit and/or a tuning circuit including a resonance circuit composed of a capacitor and an inductor or a capacitor and a resistor. The oscillator or tuner circuit is adapted to respond to a carrier wave of 38 kHz or a pilot signal of 19 kHz to generate a signal having, for example, 38 kHz which is necessary to perform a demodulation of an input signal. Since such capacitor and/or inductance coil of the tuning or oscillator circuit is externally provided and regulation means for tuning the tuning circuit and/or oscillator circuit to the carrier or pilot frequency are necessary, it is common to use an oscillator circuit utilizing a ceramic or quartz vibrator. As a result, an FM demodulator circuit becomes realizable by using an oscillator oscillating at the carrier or pilot frequency, without necessity of a regulation means.

Figure 5:
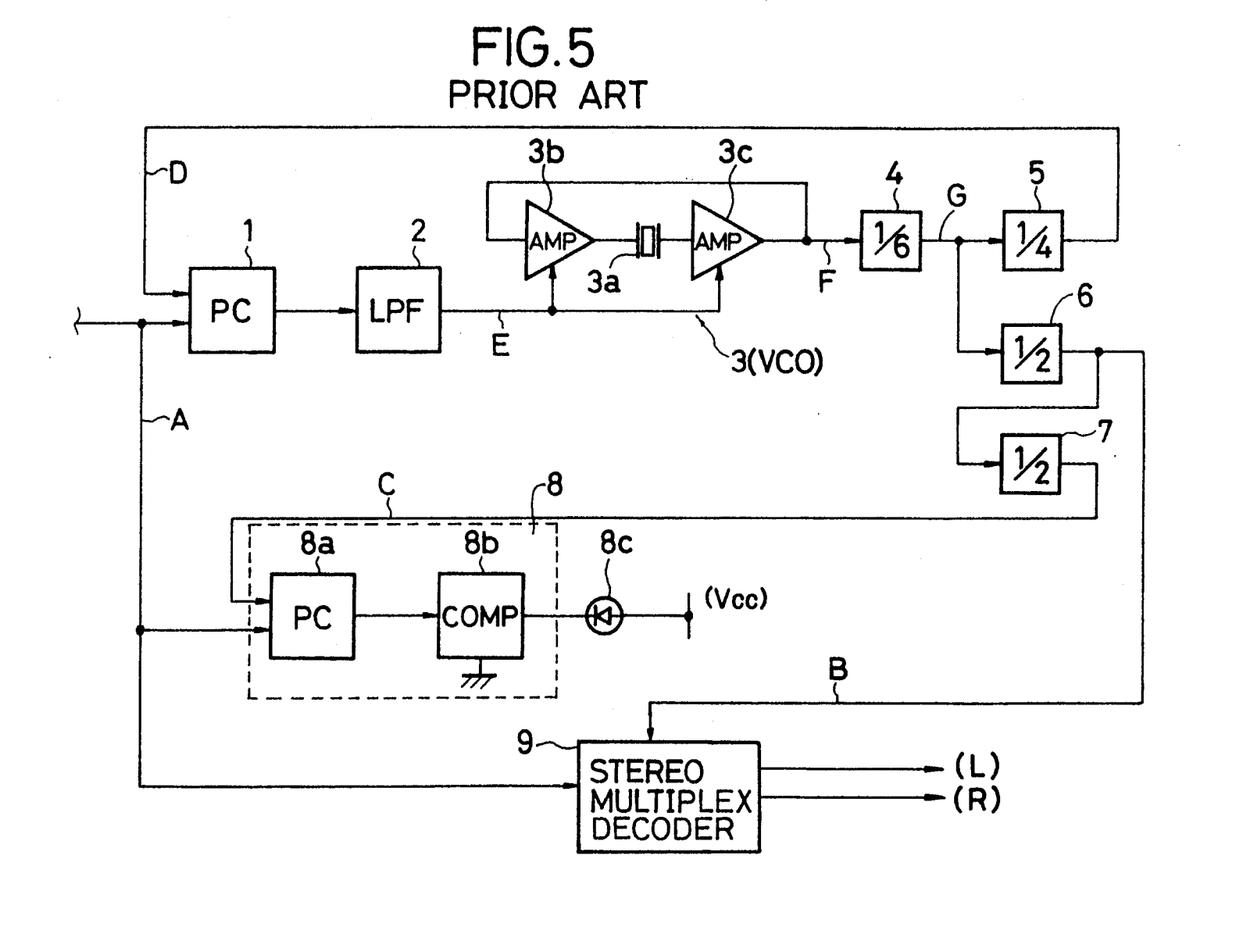
FIG. 5 is a block circuit diagram of a conventional stereo signal demodulator circuit.

FIG. 5 is a block circuit diagram of an example of a conventional stereo signal demodulator circuit using a ceramic vibrator, which is disclosed in, for example, Japanese Patent Application Laid-open No. Hei 1-17603 or Japanese Utility Model Application Laid-open No. Sho 1-38989.

The demodulator circuit shown in FIG. 5 comprises a phase comparator circuit (PC) 1, a low-pass filter (LPF) 2, a voltage-controlled oscillator circuit (VCO) 3 composed of a pair of amplifiers 3b and 3c connected in series through a ceramic vibrator 3a which is externally mounted, a 1/6 frequency divider circuit 4, a ¼ frequency divider circuit 5, two ½ frequency divider circuits 6 and 7, a detection circuit 8 composed of a phase comparator circuit (PC) 8a and a comparator (COMP) 8b for detecting a received stereo signal, a stereo indicator 8c and a stereo multiplex decoder 9.

One of the amplifiers 3b and 3c of the VCO 3 comprises a reactance circuit composed of a differential amplifier and a small capacitor which is suitable to be formed in an IC, and the other amplifier is a differential amplifier. The VCO 3 constructed as mentioned oscillates stably within a relatively narrow frequency band having a center frequency of, for example, 456 kHz as determined by the ceramic vibrator 3a, and outputs an oscillation signal F.

The VCO 3, the phase comparator circuit 1 and the low-pass filter 2 constitute a phase-locked-loop (PLL) circuit. The frequency of the oscillation signal F (which is, for example, 456 kHz) is divided by 6 by the frequency divider circuit 4. The resulting signal G is frequency-divided by 4 by the frequency divider circuit 5, resulting in a signal D having a frequency of 19 kHz corresponding to a pilot signal frequency of an FM detection signal A. This stereo composite signal is received by an FM receiver, amplified by an intermediate frequency amplifier and detected by an FM detector circuit. The phase comparator circuit 1 then compares the phase of the signal D with that of the FM detection signal A.

A voltage output signal of the phase comparator circuit 1 containing a component indicative of phase error is supplied to the low-pass-filter 2 to remove a high frequency component thereof. The remaining low frequency component of the voltage output signal is supplied to the VCO 3 as an error voltage signal E indicative of phase error or phase difference between the signals D and A.

The center frequency of the oscillation signal F of the VCO 3 is controlled by this error voltage signal E. That is, the center frequency is changed at a rate dependent on characteristics of the low-pass-filter 2 in such a direction that the phase difference between the signals A and D is reduced until the signal D is ultimately locked in phase to the FM detection signal A having a center frequency of 19 kHz, according to the so-called PLL control. As a result, the oscillation signal F, whose center frequency is 456 kHz and whose phase follows the phase of the FM detection signal A having a center frequency of 19 kHz, is produced.

The 1/6 frequency divider circuit 4 generates a signal G having a center frequency of 76 kHz by dividing the frequency of the oscillation signal F by 6. The signal G is frequency-divided by the ¼ frequency divider circuit 5, resulting in a signal D having a center frequency of 19 kHz, and by the ½ frequency divider circuit 6, resulting in a signal B having a center frequency of 38 kHz. The latter signal B is supplied to the stereo multiplex decoder 9 for demodulating the stereo signal, and to the ½ frequency divider circuit 7. The ½ frequency divider circuit 7 divides the frequency of the signal B by 2, resulting in a signal C having a center frequency of 19 kHz for detecting the stereo state. The signals B and C are synchronized with each other and follow the FM detection signal A such that they become in phase with the signal A by the PLL control. Since it is conventional that frequency division is performed by the ½ frequency divider circuit 6 in a phase which is different from that of the ¼ frequency divider circuit 5 by 90°, the phase of the signal C differs from that of the signal D by 90°.

The stereo multiplex decoder 9 includes a multiplier circuit as a main component and produces audio stereo signals (L, R) by multiplying the FM detection signal A with the multiplex signal B. An optimum stereo signal demodulation can be realized during a time when the phase of the multiplex signal B is locked to the phase of the FM detection signal A by the PLL control.

The stereo detection circuit 8 energizes the stereo indicator 8c according to whether or not the phase difference of 90° between the FM detection signal A and the signal C is maintained. That is, when the phase difference 90° between the FM detection signal A and the signal C is maintained exactly, a predetermined voltage whose level is higher than the reference level of the comparator 8b is generated, upon which the comparator 8b outputs a signal with which the stereo indicator 8c is lit. When the receiving condition of the FM broadcasting signal is good, the stereo indicator 8c is lit while, when the receiving condition is not good, the stereo indicator 8c is not lit since the phase relation between the signals A and C cannot be maintained.

As mentioned previously, the VCO 3 of the conventional stereo signal demodulation circuit includes the vibrator 3a which may be a ceramic or quartz vibrator having a predetermined natural frequency. When, for example, the ceramic vibrator is used, the oscillation frequency of the VCO 3 for the output signal of the FM detector having a center frequency of 19 kHz is 456 kHz which is 24 times the detection output signal frequency. Although, in order to obtain the desired frequency, such a high oscillation frequency must be divided by using a number of frequency divider circuits, the ceramic vibrator to be used can be small and inexpensive.

However, a chip area to be occupied by such integrated frequency divider circuits of the stereo signal demodulator circuit is considerable. When the chip area increases, the yield of chip per wafer is lowered, resulting in increased manufacturing cost of the IC. Further, since the vibrator must be mounted externally, performance of utilization means may be degraded due to degradation of the vibrator, etc., with time. It is well known that the externally-mounted vibrator is expensive compared with other electronic parts such as resistors, capacitors and coils, etc., which are also to be mounted externally. On the other hand, characteristics of such electronic parts usually have a temperature dependency and a time dependency. Further, they require manual regulation, lowering manufacturing efficiency. In addition, variations of products and manufacturing cost thereof are also increased.

SUMMARY OF THE INVENTION

An object of the present invention is to provide a stereo signal demodulator circuit suitable to be manufactured in the form of an IC, which has no externally mounted parts such as a vibrator, requires no manual regulation, is small in size and is minimally influenced by variations with time.

Another object of the present invention is to provide a stereo signal demodulator such as a tuner, etc., including a stereo signal demodulator circuit which is suitable to be manufactured in the form of an IC, has no externally mounted parts such as a vibrator, and requires no manual regulation.

The stereo signal demodulator circuit and the stereo signal demodulator of the present invention which achieve the above objects, in which a stereo signal is demodulated by using a PLL circuit including a voltage-controlled oscillator (VCO) circuit for generating a first oscillation signal and a second oscillation signal having a phase different from that of said first oscillation signal by substantially 90°, is featured in that the voltage-controlled oscillator circuit includes a first amplifier for outputting a signal whose phase is different from that of an input signal by substantially 90°, a second amplifier for outputting a signal whose phase is different from that of an input signal by substantially 90°, and a third amplifier for outputting a signal whose phase is different from that of an input signal by substantially 180°, the first, second and third amplifiers being connected in series to generate an output signal different, in phase, from the input signal of the first amplifier by substantially 360°. The VCO and oscillates by feeding the output signal back to the input side, and operating currents of the first and second amplifiers are controlled by a control voltage generated in the PLL circuit for controlling the oscillation frequency of the voltage-controlled-oscillator circuit, the first oscillation signal being derived from said output of one of the first amplifier and second amplifiers and the second oscillation signal being derived from one of the input and output of one of the first and second amplifiers.

The first and second amplifiers are active integration circuits each composed of a variable mutual conductance (Gm) amplifier and a capacitor and connected in series. The oscillation frequency of the voltage-controlled-oscillator circuit is controlled by controlling amounts of charge/discharge currents of the capacitors.

In the stereo signal demodulator circuit constructed as mentioned above, and in the stereo signal demodulator using the same, since the VCO is constituted by connecting three amplifiers having output phase differences with respect to the input of substantially 90°, 90° and 180°, respectively, there is no need of manual regulation thereof, nor of mounting a vibrator element externally. Further, since the operating currents of the amplifiers are controlled, the oscillating state is stabilized even if the current level of the oscillation signal is small. As a result, it is possible to easily obtain the oscillation signal whose frequency is as low as that of the pilot signal of the FM detection signal.

Further, since two signals different in phase by 90° are obtained simultaneously from the oscillation signal of the single VCO, there is no need of providing a circuit for generating such signals having phases different by 90°, realizing miniaturization of the circuit size. Further, since no vibrator element is used, there is no need of externally mounted parts and no need of manual regulation of such an element.

DESCRIPTION OF THE PREFERRED EMBODIMENTS

Figure 1:
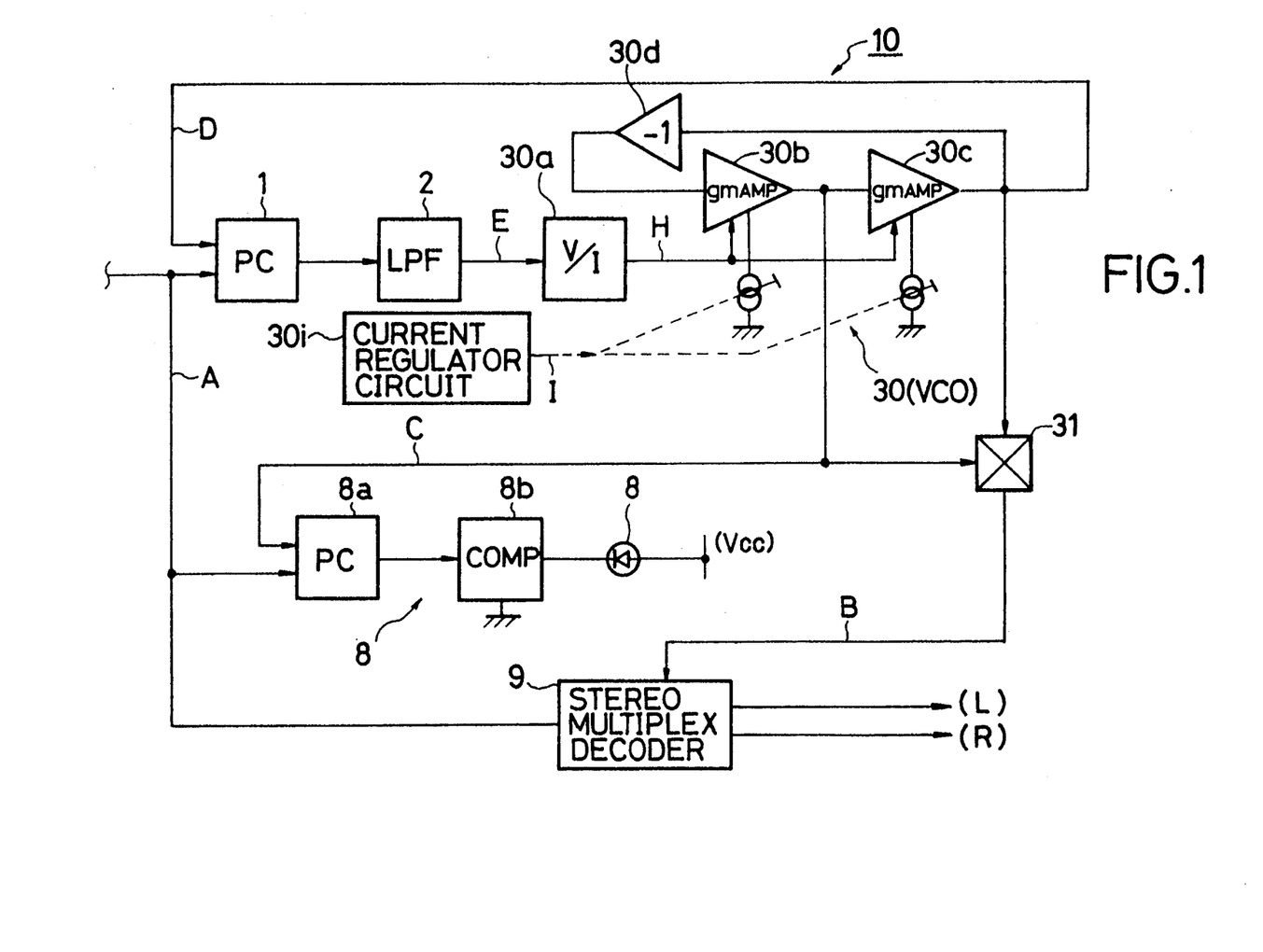
FIG. 1 is a block circuit diagram of an embodiment of a stereo signal demodulator circuit according to the present invention.

A stereo signal demodulator circuit 10 shown in FIG. 1 includes a voltage-controlled oscillator (VCO) 30 constituted with a voltage-current converter circuit 30a; charge/discharge circuits 30b and 30c each comprising, mainly, an active integrator circuit composed of a variable Gm amplifier and a capacitor; an inverter amplifier 30d and a current regulation circuit 30i for setting operating currents of the variable Gm amplifiers with which a center frequency of the VCO 30 is determined. The charge/discharge circuits 30b and 30c of the VCO 30 generate signals having a common frequency of 19 kHz corresponding to a frequency of a pilot signal of an input stereo audio signal, with phases different from each other by 90° as will be described in detail later.

In order to generate a signal of 38 kHz which is necessary to decode the stereo audio signal, a multiplier circuit 31 is provided for multiplying the two output signals of the VCO 30.

As is clear from FIG. 1, there are no frequency divider stages, unlike the conventional circuit shown in FIG. 5.

Other constructive components of the demodulator circuit shown in FIG. 1 are the same as those of the conventional demodulator circuit shown in FIG. 5 and depicted by the same reference numerals as those used in FIG. 5. Therefore, details thereof are omitted.

Figure 3:
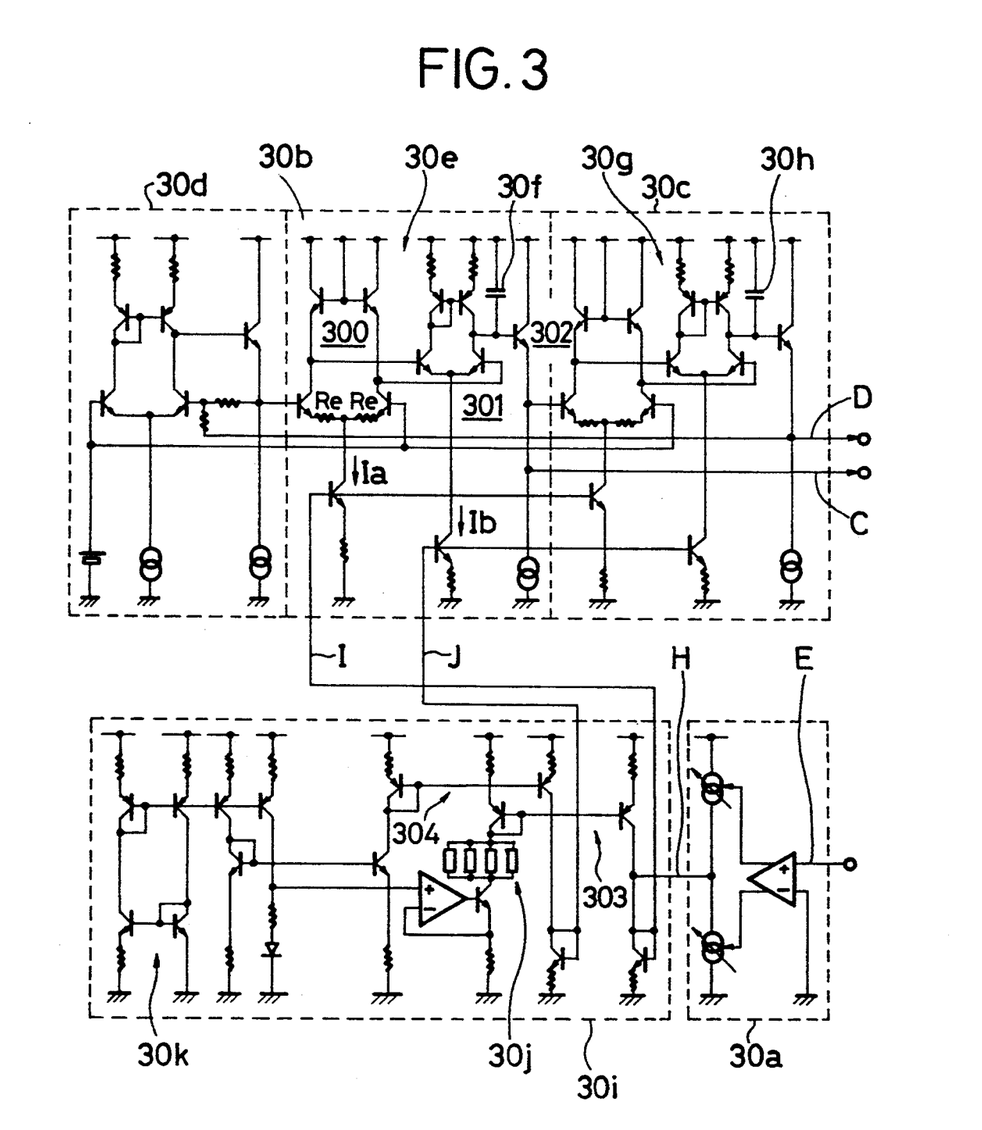
FIG. 3 is a circuit diagram of a VCO used in the embodiment shown in FIG. 1.

An example of the circuit of the VCO 30 is shown in FIG. 3. In FIG. 3, the charge/discharge circuit 30b is constituted with a variable Gm amplifier 30e, a charge/discharge capacitor 30f and a buffer amplifier 302, and the charge/discharge circuit 30c is constituted with a variable Gm amplifier 30g, a charge/discharge capacitor 30h and a buffer amplifier similar to the buffer amplifier 302 of the charge/discharge circuit 30b. The current regulator circuit 30i is adapted to determine Gms of the variable Gmn amplifiers 30e and 30g of the charge/discharge circuits 30b and 30c by regulating charge/discharge current values of the charge/discharge circuits 30b and 30c so that a predetermined center frequency of the VCO 30 is obtained.

Since the charge/discharge circuit 30c has the same construction as that of the charge/discharge circuit 30b and operates similarly, only the charge/discharge circuit 30b will be described in detail.

As shown in FIG. 3, the variable Gm amplifier 30e of the charge/discharge circuit 30b is constituted with series connected differential amplifiers 300 and 301. The charge/discharge capacitor 30f inserted between an output of the second stage differential amplifier 301 and a power supply line Vcc or a ground line is charged/discharged through an active resistor having a value determined by the Gm of the variable Gm amplifier 30e.

The first stage differential amplifier 300 of the variable Gm amplifier 30e includes a pair of differential transistors having emitters connected to each other through series connected emitter resistors Re and forms a voltage-current converter circuit. The second stage differential amplifier 301 amplifies an output of the first stage differential amplifier 300. The Gm of the variable Gm amplifier 30e is determined by a ratio of a current Ib of a current source of the second stage differential amplifier 301 to a current Ia of a current source of the first stage differential amplifier 300 and a value of the emitter resistor Re of the first stage differential amplifier 300.

That is, the Gm of the variable Gm amplifier 30e and hence an output impedance of the variable Gm amplifier 30e depends upon the current value of these current sources and, thus, a charge/discharge time constant of the capacitor 30f depends upon these currents.

The variable Gm amplifier 30e and the variable Gm amplifier 30g having the same construction and operating in the same way as those of the amplifier 30e are connected in series through the buffer amplifier 302, so that a 90° phase difference is provided between an input and an output of each variable Gm amplifier, resulting in a total of 180° phase difference between the input of the variable Gm amplifier 30e and the output of the variable Gm amplifier 30g. Further, the phase of the input of the variable Gm amplifier 30e is shifted by 180° by the inverter amplifier 30d connected to the input of the variable Gm amplifier 30e. Therefore, the phase of the output signal of the variable Gm amplifier 30g is shifted by 360° with respect to the input signal of the variable Gm amplifier 30e to form a positive feedback loop, resulting in a CR oscillator circuit having a variable resistance value.

In FIG. 3, the voltage-current converter circuit 30a includes a comparator and a pair of series connected current sources and converts a voltage signal E into a control current H to be described later.

The current value regulation circuit 30i includes a resistor circuit 30j for selecting a resistance value for determining a value of the control current H generated by the voltage-current converter circuit 30a and a temperature compensation circuit 30k. The resistance circuit 30j comprises a plurality of parallel-connected resistors, and the Gms of the variable Gm amplifiers 30e and 30g for setting the oscillation frequency of the VCO 30 is determined by control currents I and J determined thereby.

The voltage E to be converted into the current H by the voltage-current converter circuit 30a corresponds to the phase difference between the signals A and D, and the control currents I and J determine current value Ia of the current source of the initial stage amplifier 300 of the variable Gm amplifier 30e and the current value of the current source of the variable Gm amplifier 30g. With these control currents, the oscillation frequency of the VCO 30 is controlled such that it becomes in phase with the signal A. The current value Ia is also a regulation object of the current value regulation circuit 30i. Thus, the output current H of the voltage-current converter circuit 30a is supplied to an output side transistor of a current mirror 303 of the current value regulator circuit 30i.

The current value regulation circuit 30i sets the current value Ia of the current source of the initial stage amplifier 300 to a predetermined value by supplying the current value I determined as the control current by the selected resistance value of the resistance circuit 30j to the current source through the current mirror 303. Further, this circuit 30i supplies the current stabilized by the temperature compensation circuit 30k to the current source of the second stage amplifier 301 as the control current J through the current mirror 304 so that the current value Ib of the current source of the second stage amplifier 301 is controlled to a constant value. The current value regulation circuit 30i supplies the control currents I and J to the variable Gm amplifier 30g in a similar way.

In operation, the inverter amplifier 30d and the charge/discharge circuits 30b and 30c are connected in order to form an oscillation loop. The charge/discharge circuit 30b receives the input signal inverted by the inverter amplifier 30d as an input voltage signal of the variable Gm amplifier 30e thereof, and the inverted voltage signal is converted into a charge/discharge current. The capacitor 30f is charged/discharged by the charge/discharge current to form the charge/discharge voltage signal C. Due to this charge/discharge, the phase of the charge/discharge voltage signal C is delayed by 90° from that of the inverted voltage signal.

The construction of the charge/discharge circuit 30c is completely the same as that of the charge/discharge circuit 30b. The charge/discharge circuit 30c receives the charge/discharge voltage signal C and produces a charge/discharge voltage signal D whose phase is further delayed by 90°. The charge/discharge voltage signal D is inverted by the inverter amplifier 30d, resulting in the above mentioned inverted voltage signal whose phase is further delayed by 180°. The phase of the inverted voltage signal is changed by 360° after being circulated through the loop; that is, the original phase thereof is recovered. This is repeated, and thus the oscillation loop continues to oscillate. In order to prevent the oscillation signal from being influenced by the output side, the charge/discharge voltages are not directly output and, instead are passed through the transistor 302 and output as the signals C and D.

The oscillation frequency of the VCO 30 in this case depends upon the charge/discharge currents of the capacitors 30f and 30h. That is, the charge/discharge currents are regulated by the current values of the current sources of the initial stage amplifiers of the variable gain amplifiers 30e and 30g, which are controlled by the current value supplied by the voltage-current converter circuit 30a. The center frequency of the VCO 30 is set by setting the current value Ia of the current source of the initial stage amplifier 300 to a predetermined reference value by the current value I of the current value regulation circuit 30i.

The charge/discharge current is produced as a differential signal of the differential transistor circuit and is controlled by the current value of the downstream current source. Thus, the control of the value of the charge/discharge current is stable even if the charge/discharge current is very small. Therefore, it is possible to maintain the charge/discharge time constant of the VCO 30 at a large value even if the capacitances of the capacitors 30f and 30h are small. With the capacitors having small values, there is no substantial increase of chip area therefor, and thus it is possible to form them within the IC. Further, since the oscillation signal has a signal waveform of a harmonic function such as sine or cosine, etc., which has no high harmonics, noise generation is minimized.

However, variations in amplification of the amplifiers 30e and 30g and variations in capacitance of the capacitors 30f and 30h which may be caused by variation of manufacturing conditions cannot be ignored. When the whole circuit is simply formed in an IC, the oscillation frequency of the individual IC may be varied substantially by these variations even if an identical voltage is used as the control voltage E. In the present circuit, however, the center frequency of the VCO 30 can be set when the current values of the current sources of the differential amplifiers are determined, as mentioned previously.

The oscillation frequency of the VCO 30 is determined by the current ratio of the current sources of the variable Gm amplifiers. Therefore, the current value Ib of the current source of the second stage amplifier 301 is set to substantially a constant value by means of the current value regulation circuit 30i so that a range of variation of the oscillation center frequency f0 is preliminarily restricted to restrict the control range of the current value Ia of the current source of the initial stage amplifier 300 which is to be performed by the current value regulation circuit 30i. In other words, it is possible to restrict a range of resistance values of the resistance circuit 30j which determines the operating current value Ia.

Thus, it is possible to determine the resistance value by trimming a resistance pattern in the IC and also to restrict a resistance range to be selected by trimming the pattern. That is, the resistance circuit 30j in the shown embodiment is composed of a parallel circuit of four resistors with a resistance ratio of 1 : 2 : 4 : 8. By using all of the resistors or by removing one of these resistors by means of, for example, a laser trimming device and combining suitably the remaining resistors, any one of 16 resistance values can be selected as the resistance value of the resistance circuit 30j, with which the operating currents of the variable Gm amplifiers 30e and 30g and hence the charge/discharge currents can be determined.

Since, in the circuit shown in FIG. 3, the control current contains a current component H converted from the control voltage E, the current component H is subtracted, in order to obtain the final control current I. The operating currents of the amplifiers 30e and 30g which are determined by this control current I correspond to the center frequency of the oscillation.

The selection of resistance value of the resistance circuit 30j by means of the laser trimming device can be performed automatically. In the stereo signal demodulation circuit shown in FIG. 1, the resistance selection may be performed automatically by a frequency value of any output signal thereof in such a way as to be described.

That is, in an IC probe test, for example, the reference voltage is used as the control signal E and the frequency of such as the signal C obtained thereby is measured and compared with the reference frequency thereof. The laser trimming device automatically selects an optimum resistance value of the resistance circuit 30j by trimming the resistor pattern of the resistance circuit 30j such that a deviation of the measured frequency from the reference frequency is cancelled as precisely as possible.

The VCO 30 which is preliminarily regulated during the manufacturing process of the IC can oscillate stably with minimum variation of its characteristics such as oscillation frequency characteristics and, with application of the control voltage E, can output the signals C and D having predetermined frequencies corresponding to the applied control voltage without necessity of any further regulation.

The IC containing this VCO 30 does not require any regulation circuit, etc., to be mounted externally and there is no need of regulation even after the IC is assembled in a utilization device.

The illustrated circuit pattern of the resistance circuit 30j of the VCO 30 is a mere example and many modifications thereof are possible without difficulty. For example, the number of resistors connected in parallel is not particularly limited, and the resistance value of each resistor may be determined according to the required accuracy of resistance to be selected. Further, the wiring of these resistors may include series connections between these resistors.

In FIG. 3, the temperature compensation circuit 30k is provided as a portion of the current regulation circuit 30i. The temperature compensation circuit 30k compensates for not only the control current Ib but also the signal I to the constant current source which is not a control object, resulting in a further improved temperature characteristic of the whole circuit.

The VCO 30 oscillates at a frequency as low as 19 kHz, which is the frequency of the pilot signal contained in the FM detection signal A, to produce the signals C and D having sine waveforms. The signals C and D are multiplied with each other by the multiplier circuit 31. Since the signals C and D are different in phase by 90°, the result of the multiplication is a sine wave signal of doubled frequency, which is the multiplex signal B of 38 kHz. As mentioned, in the VCO 30 of this embodiment, it is possible to produce two signals having the same frequency of 19 kHz and phases different from each other by 90° and, therefore, to obtain the signal of 38 kHz by means of the single multiplier circuit. Thus, it is possible to substantially reduce the circuit size.

Other operations of this embodiment are the same as those of the conventional construction shown in FIG. 5 and therefore they are omitted for avoidance of duplication.

Figure 2:
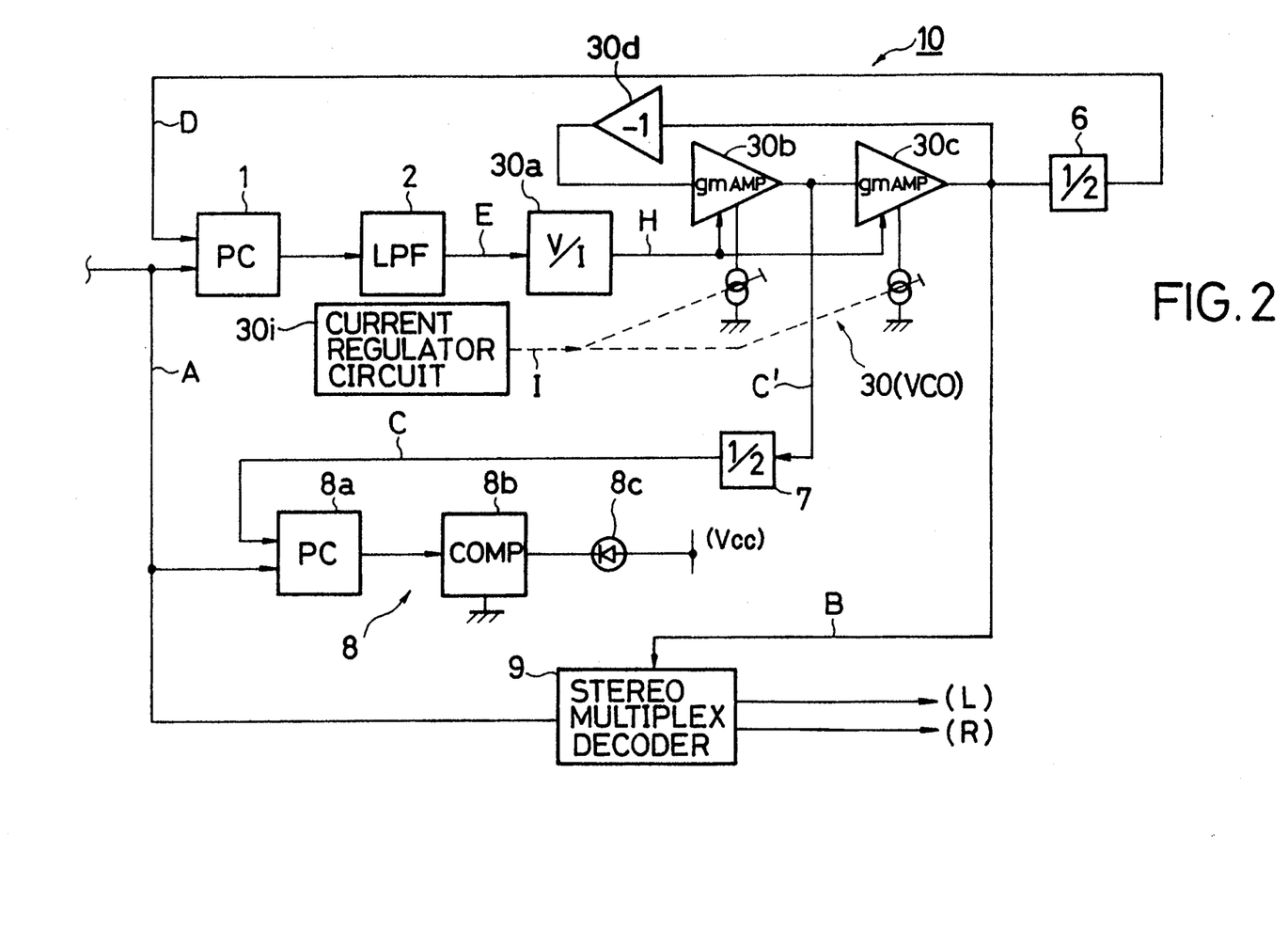
FIG. 2 is a block circuit diagram of another embodiment of a stereo signal demodulator circuit according to the present invention.

FIG. 2 shows another embodiment of a stereo signal demodulator circuit according to the present invention. A VCO 30 of this embodiment oscillates at 38 kHz which is twice the frequency of the FM detection signal A and produces signals B and C' having sine waveforms and phases different from each other by 90°. The signal B is directly used as the multiplex signal B.

The FM detection signal A is used as an input signal and the signal B is frequency-divided by a ½ frequency divider circuit 6, resulting in a signal D of 19 kHz, and a PLL control is performed by using the signal D as a feedback signal.

The signal C' is also frequency-divided by a ½ frequency divider circuit 7, resulting in a stereo detection signal C.

According to this embodiment, the number of frequency divider circuits is reduced to only two and therefore the circuit size is substantially reduced compared with the conventional construction.

Figure 4:
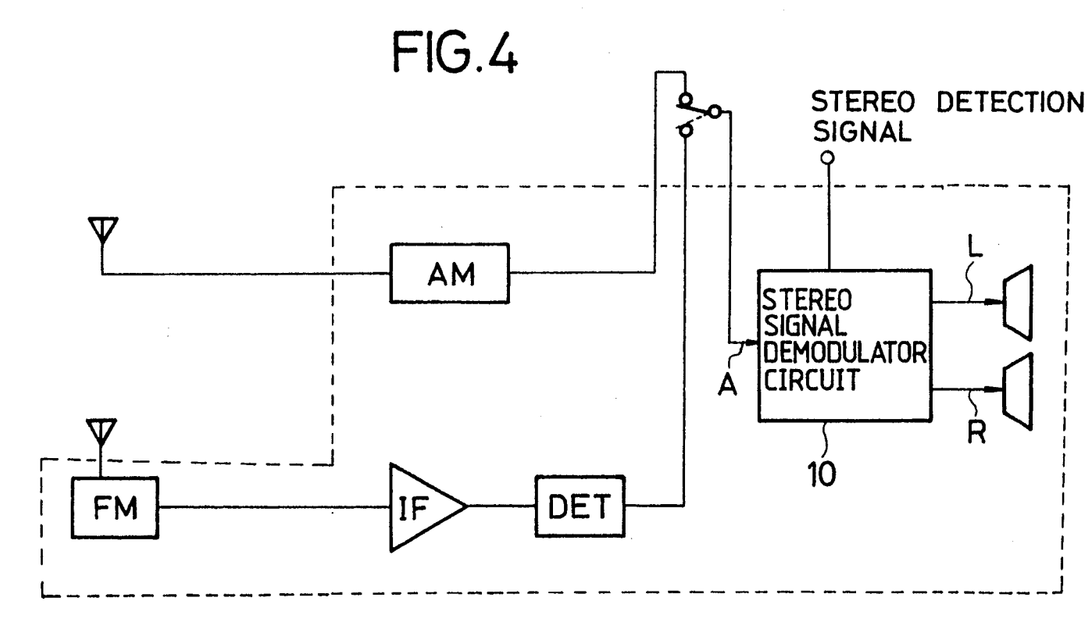
FIG. 4 is a block circuit diagram of an AM/FM receiver which utilizes the stereo signal demodulator circuit shown in FIG. 1 as a stereo signal modulator.

FIG. 4 is a schematic block diagram of an embodiment of a stereo signal demodulator using a stereo signal demodulator circuit according to the present invention, when used in an AM/FM receiver. The stereo signal demodulator circuit 10 is shown in FIG. 1 or 2. Since the circuit size thereof is substantially reduced as mentioned previously, a substantial portion of the stereo signal demodulator can be formed, together with an AM receiving circuit (AM), an intermediate frequency amplifier (IF) of an FM receiving circuit and a detection circuit (DET), etc., in an IC chip as shown by a dotted line. Thus, it is possible to miniaturize a tuner or receiver.

Stereo signals L and R demodulated from the FM detection signal A are sent to a subsequent recording circuit or output as audio signals from loudspeakers after being amplified or processed.

What is claimed is:

1. A stereo signal demodulator circuit for demodulating a stereo signal by decoding a stereo audio signal using an FM detection signal containing a pilot signal, said stereo demodulator circuit comprising:

a phase-locked-loop circuit including a voltage-controlled oscillator circuit for generating a first oscillation signal and a second oscillation signal having a phase different from that of said first oscillation signal by substantially 90°, said phase-locked-loop circuit being adapted to compare said FM detection signal with said first oscillation signal, to generate a control voltage corresponding to a result of the comparison, to control said voltage-controlled oscillator such that said voltage-controlled oscillator circuit generates said first oscillation signal having a center frequency equal to either the frequency of said pilot signal or an integer multiple of said pilot signal frequency;

a stereo multiplex decoder for forming said stereo signal by multiplying said FM detection signal with said first oscillation signal or an integer multiple of said first oscillation signal as the stereo audio signal; and a stereo detection circuit for generating a detection signal indicative of presence of said stereo signal by comparing phases of said FM detection signal and said second oscillation signal or a fraction of said second oscillation signal, wherein said voltage-controlled oscillator circuit includes a first amplifier for outputting a signal whose phase is different from that of an input signal to the first amplifier by substantially 90°; a second amplifier for outputting a signal whose phase is different from that of an input signal to the second amplifier by substantially 90°; and a third amplifier for outputting a signal whose phase is different from that of an input signal to the third amplifier by substantially 180°, said first, second and third amplifiers being connected in series so that an output signal of said third amplifier is different, in phase, from said input signal of said first amplifier by substantially 360°; and a positive feedback loop for feeding back said output signal of said third amplifier to an input of said first amplifier; and wherein operating currents of said first and second amplifiers are controlled by said control voltage such that said first oscillation signal is derived from said output of one of said first and second amplifiers, and said second oscillation signal is derived from one of said input and output of one of said first and second amplifiers.

2. The stereo signal demodulator circuit claimed in claim 1, wherein said first amplifier includes a first capacitor for phase-shifting said input signal of said first amplifier by substantially 90° by charging/discharging said first capacitor, said second amplifier includes a second capacitor for phase-shifting said output signal of said first amplifier by substantially 90° to thereby shift said input signal of said first amplifier by substantially 180° by charging/discharging said second capacitor, and said third amplifier phase-shifts the output signal of said second amplifier by 180° to thereby phase-shift said input signal of said first amplifier by substantially 360°, said output signal of said third amplifier being fed back to said input of said first amplifier.

3. The stereo signal demodulator circuit claimed in claim 1, wherein said first and second amplifiers constitute an active integration circuit.

4. The stereo signal demodulator circuit claimed in claim 3, wherein said phase locked loop circuit comprises a phase comparator circuit for comparing the phase of said first oscillation signal with the phase of said FM detection signal, a low-pass filter responsive to a result of comparison for generating said control voltage, and a voltage/current converter circuit for converting said control voltage into a current, said first and second amplifiers having respective charge/discharge currents that are controlled by said current converted by said voltage/current converter circuit, and wherein said phase-locked loop circuit, said stereo multiplex decoder and said stereo detection circuit are integrated in a single IC chip.

5. The stereo signal demodulator circuit claimed in claim 4, wherein the center frequency of said first oscillation signal corresponds to the frequency of said pilot signal, and further comprising a multiplier circuit for multiplying said first oscillation signal with said second oscillation signal to generate an output signal having a frequency that is twice the frequency of said pilot signal, the output signal of said multiplier circuit being supplied to said stereo multiplex decoder as said stereo audio signal to be multiplied with said FM detection signal, said second oscillation signal being supplied to said stereo detection circuit as said signal to be phase-compared with said FM detection signal.

6. The stereo signal demodulator circuit claimed in claim 4, wherein the center frequency of said first oscillation signal corresponds to twice the frequency of said pilot signal, and further comprising a first frequency divider circuit for dividing said frequency of said first oscillation signal by two, and a second frequency divider circuit for dividing said frequency of said second oscillation signal by two, wherein said phase comparator circuit compares, the phase of said FM detection signal with the phase of an output of said first frequency divider circuit, said first oscillation signal is supplied to said stereo multiplex decoder as said stereo audio signal to be multiplied with said FM detection signal, and the output of said second frequency divider circuit is supplied to said stereo detection circuit as said signal whose phase is compared with that of said FM detection signal.

7. The stereo signal demodulator circuit claimed in claim 4, wherein said first and second amplifiers are variable Gm amplifiers each composed of a pair of series connected differential amplifiers, first stage differential amplifiers of said variable Gm amplifiers having current sources for generating currents that are controlled according to said current of said voltage/current converter circuit.

8. The stereo signal demodulator circuit claimed in claim 7, said first stage differential amplifiers further comprising a current regulation circuit including a resistance circuit having a plurality of resistors trimmed during a manufacturing process, wherein the current values of said current sources of said first stage variable Gm amplifiers are set according to a resistance value of said resistance circuit determined by the trimming.

9. The stereo signal demodulator circuit claimed in claim 8, wherein said Variable Gm amplifiers include second stage differential amplifiers, and wherein said current regulation circuit is adapted to set current values of current sources of the second stage differential amplifiers of said variable Gm amplifiers to predetermined values.

10. A stereo signal demodulator comprising:
   an FM signal processing circuit for processing a received an FM modulated signal containing a pilot signal to obtain an FM detection signal containing said pilot signal;
   a phase locked loop circuit including a voltage-controlled oscillator circuit for generating a first oscillation signal and a second oscillation signal having a phase different from that of said first oscillation signal by substantially 90°, said phase locked loop circuit being adapted to compare said FM detection signal with said first oscillation signal, to generate a control voltage corresponding to a result of the comparison, to control said voltage-controlled oscillator such that said voltage-controlled oscillator circuit generates said first oscillation signal having a center frequency equal to either the frequency of said pilot signal or an integer multiple of said pilot signal frequency;
   a stereo multiplex decoder for forming a stereo signal by multiplying said FM detection signal with said first oscillation signal or an integer multiple of said first oscillation signal; and
   a stereo detection circuit for generating a detection signal indicative of presence of said stereo signal by comparing phases of said FM detection signal and said second oscillation signal or a fraction of said second oscillation signal,
   wherein said voltage-controlled oscillator circuit includes a first amplifier for outputting a signal whose phase, is different from that of an input signal to the first amplifier by substantially 90°; a second amplifier for outputting a signal whose phase is different from that of an input signal to the second amplifier by substantially 90°; and a third amplifier for outputting a signal whose phase is different from that of an input signal to the third amplifier by substantially 180° said first, second and third amplifiers being connected in series so that an output signal of said third amplifier is different, in phase, from said input signal of said first amplifier by substantially 360°; and a positive feedback loop for feeding back said output signal of said third amplifier to an input of said first amplifier; and wherein operating currents of said first and second amplifiers are controlled by said control voltage such that said first oscillation signal is derived from said output of one of said first and second amplifiers, and said second oscillation signal is derived from one of said input and output of one of said first and second amplifiers.

11. The stereo signal demodulator claimed in claim 10, wherein said first amplifier includes a first capacitor for phase-shifting said input signal of said first amplifier by substantially 90° by charging/discharging said first capacitor, said second amplifier includes a second capacitor for phase-shifting said output signal of said first amplifier by substantially 90° to thereby shift said input signal of said first amplifier by substantially 180° by charging/discharging said second capacitor, and said third amplifier phase-shifts the output signal of said second amplifier by substantially 180° to thereby phase-shift said input signal of said first amplifier by substantially 360°, said output signal of said third amplifier being fed back to said input of said first amplifier.

* * * * *